United States Patent
Toepfer et al.

(10) Patent No.: US 6,517,639 B2
(45) Date of Patent: Feb. 11, 2003

(54) METHOD AND DEVICE FOR DECONTAMINATING INTERIOR SPACES

(75) Inventors: Hans-Joachim Toepfer, Backnang (DE); Roland Kurz, Gaildorf (DE); Ruediger Hellstern, Stuttgart (DE); Ulli Reinhardt, Backnang (DE); Dimitri Dratchnev, Esslingen (DE)

(73) Assignee: Alfred Kaercher GmbH & Co., Winnenden (DE)

( * ) Notice: Subject to any disclaimer, the term of this patent is extended or adjusted under 35 U.S.C. 154(b) by 0 days.

(21) Appl. No.: 09/834,097

(22) Filed: Apr. 12, 2001

(65) Prior Publication Data

US 2002/0112313 A1 Aug. 22, 2002

Related U.S. Application Data

(63) Continuation of application No. PCT/EP99/04509, filed on Jun. 30, 1999.

(30) Foreign Application Priority Data

Oct. 14, 1998 (DE) .......................................... 198 47 238

(51) Int. Cl.$^7$ ................................................. A47L 9/00
(52) U.S. Cl. ........................... 134/21; 15/320; 15/340.1
(58) Field of Search ....................... 15/315, 321, 340.1, 15/320; 134/21

(56) References Cited

U.S. PATENT DOCUMENTS 4,095,309 A * 6/1978 Sundheim ..................... 15/320

(List continued on next page.)

FOREIGN PATENT DOCUMENTS

| DE | 34 32 282 | 3/1986 |
|---|---|---|
| DE | 35 45 488 | 7/1987 |
| DE | 36 18 885 | 12/1987 |
| DE | 38 22 679 | 1/1990 |
| DE | 91 14 613 | 3/1992 |
| DE | 41 04 134 | 8/1992 |
| DE | 44 16 649 | 11/1994 |
| EP | 0 248 322 | 12/1987 |

OTHER PUBLICATIONS

Porter–Cable Corporation, 'Power Tools Trigger New Vac's On–Off Switch', Nov. 1994, Woodworkers Journal, p. 10.*

"Mobile Water and Supply Unit", Research Disclosure, GB, Industrial Opportunities Ltd. Havant, No. 291, p. 525 XP 000006541.

Dr. Alexander Grabowki, "Decon Module for Sensitive Equipment", Proceedings of the Sixth International Symposium on Protection against Chemical and Biological Warfare Agents, Stockholm, Sweden, May 10–15, 1998, pp. 153–156.

*Primary Examiner*—Theresa T. Snider
(74) *Attorney, Agent, or Firm*—Barry R. Lipsitz; Douglas M. McAllister

(57) ABSTRACT

A method and a device for decontaminating interior spaces are proposed. It is provided here that a base station and at least one mobile subunit are provided, the base station comprising a supply of decontamination agent and fuel and the subunit comprising decontamination equipment and a tank for ready-to-use decontamination agent, that the subunit is supplied with decontamination agent and with fuel at the base station and then transported to the item requiring decontamination of its interior space, the decontamination of the interior space is carried out and subsequently the subunit is returned to the base station to be re-supplied there with decontamination agent and fuel. Also proposed is a device with an off-road, automotive undercarriage with a drive motor, a storage tank for a decontamination liquid and a receiving tank for used decontamination liquid as well as a spray-extraction device for decontaminating the interior surface and with a generator for supplying power.

22 Claims, 2 Drawing Sheets

U.S. PATENT DOCUMENTS

| | | | |
|---|---|---|---|
| 4,141,374 A | | 2/1979 | McMahan ..................... 134/46 |
| 4,210,978 A | * | 7/1980 | Johnson et al. ................ 15/320 |
| 4,240,175 A | | 12/1980 | Rogers ........................ 15/88.4 |
| 4,309,788 A | | 1/1982 | Brager et al. ................. 15/53.2 |
| 4,862,551 A | * | 9/1989 | Martinez et al. ............... 15/321 |
| 4,893,375 A | * | 1/1990 | Girman et al. ................. 15/320 |
| 4,991,254 A | * | 2/1991 | Roden et al. .................. 15/321 |
| 5,147,002 A | | 9/1992 | Hughes ........................ 15/319 |
| 5,224,236 A | * | 7/1993 | Sallquist .................. 126/271.1 |
| 5,287,589 A | * | 2/1994 | Hughes ........................ 15/321 |
| 5,501,396 A | | 3/1996 | Rohrbacher et al. ........... 239/7 |
| 6,044,519 A | * | 4/2000 | Hendrix ...................... 15/319 |
| 6,206,980 B1 | * | 3/2001 | Robinson ..................... 134/21 |

* cited by examiner

METHOD AND DEVICE FOR DECONTAMINATING INTERIOR SPACES

The present disclosure relates to the subject matter disclosed in International Application No. PCT/EP99/04509 (WO 00/21789) of Jun. 30, 1999, the entire specification of which is incorporated herein by reference.

The invention relates to a method and a device for decontaminating interior spaces.

For decontaminating various items, in particular small items of equipment and clothing, as well as for decontaminating personnel and large items of equipment and areas of land, decontamination devices accommodated in containers or superstructures on transport vehicles are usually used. To allow decontamination to be carried out, it is necessary for tents to be erected, equipment to be converted and lines to be laid in order to set up a decontamination station. Small items of equipment and clothing as well as personnel to be decontaminated are then transported to the decontamination station, where they are decontaminated. A procedure of this type is known from DE 35 45 488 A1.

When the term decontamination is mentioned hereafter, it is to be understood as meaning not only the decontamination of radioactively contaminated items but also the decontamination of biologically contaminated items and the decontamination of chemically contaminated items.

The method mentioned at the beginning has been found to be particularly successful for decontaminating small items of equipment and personnel. For decontaminating interior spaces, however, it can be used only to a restricted extent, that is only if the interior spaces are in the direct vicinity of the decontamination station. If, for example, the interior spaces of helicopters, transport aircraft or vehicles are to be decontaminated, to do so it is necessary to set up the complete decontamination station alongside the interior space to be decontaminated. This entails an extremely high level of expenditure and in many cases is not feasible in practice.

SUMMARY OF THE INVENTION

It is an object of the present invention to provide a method by which the interior space of an item which cannot be brought to a decontamination station can be decontaminated in a simple way.

This object is achieved according to the invention in the case of a method of the type described at the beginning by providing a base station and at least one mobile subunit, the base station having a supply of decontamination agent and fuel for the subunit and the subunit having decontamination equipment and a tank for decontamination agent, by the subunit being supplied with decontamination agent and fuel at the base station and transported to the item with the interior space to be decontaminated, the decontamination of the interior space being carried out there and subsequently the subunit being returned to the base station to be re-supplied with decontamination agent and fuel. A method of this type makes it possible for example to set up a central decontamination station which serves as the base station and ensures that the mobile subunits are supplied with decontamination agent and the required fuel, in particular motor fuel. A mobile subunit can then be transported, preferably by a single operator, to an item requiring decontamination of its interior spaces, and the decontamination can be carried out by means of the subunit; the mobile subunit has the required decontamination equipment for this purpose. As explained below, the equipment in question may be, for example, a spray-extraction device, with which a decontamination solution or emulsion can be applied to the surface of the interior space, which is for example radioactively contaminated, and can subsequently be extracted again. For this purpose, in addition to a storage tank, the mobile subunit comprises a receiving tank for the used decontamination agent, which can then be emptied, for example pumped out, at the base station once the subunit has returned.

The invention is also based on the object of providing a device for decontaminating interior spaces, in particular for carrying out the method explained above.

This object is achieved according to the invention by a device for decontaminating interior spaces which comprises an off-road, automotive undercarriage with a drive motor, a storage tank for a decontamination liquid and a receiving tank for used decontamination liquid as well as a spray-extraction device for applying the decontamination liquid to an interior surface to be decontaminated and for taking up the used decontamination liquid from the surface and transferring the liquid into the receiving tank, and has a generator.

A device of this type forms a mobile subunit for the method described above. The required mobility is ensured by the use of the off-road automotive chassis. Used as decontamination equipment is a spray-extraction device, with the aid of which interior surfaces can be decontaminated. For this purpose, a decontamination liquid is sprayed onto the contaminated surface. The liquid is subsequently extracted again, together with the contamination, and transferred into a receiving tank disposed on the undercarriage. Once the device forming a mobile subunit has returned to the base station, for example a central decontamination station, the receiving tank can be emptied and the storage tank can be refilled with decontamination liquid.

The device according to the invention also comprises a generator for supplying power to the spray-extraction device.

It is advantageous if the device has at least one electrical connection element for the connection of electrically operated additional equipment, so that electrically operated additional equipment can be supplied with electrical power. For mounting the additional equipment, the device according to the invention preferably has corresponding mounting elements.

An example of additional equipment which may be provided for increasing the effectiveness of radioactive decontamination (A decontamination) is a wet-dry suction device, while an aerosol generator is advantageously used for biological decontamination (B decontamination), allowing a biologically effective aerosol to be sprayed. Furthermore, a steam-extraction device may be provided, so that decontamination can be carried out with minimal use of chemicals or even without any chemicals, just water vapor. In a way corresponding to the spray-extraction, in the steam-extraction the waste products occurring during decontamination, i.e. the contaminants, reaction products and condensed water vapor, are extracted again after application and fed into the receiving tank.

It is advantageous if the receiving tank comprises a suction-removal connection for the extraction of the used decontamination liquid. The emptying of the receiving tank at the base station can then be simplified considerably as a result.

For the deployment of the spray-extraction device, two tanks are provided on the undercarriage of the device, that is a storage tank for the ready-to-use decontamination liquid and a receiving tank for the used decontamination liquid, i.e. for the waste products from decontamination. To minimize the dimensions of the device according to the invention and consequently make it particularly easy to handle, it is provided in a preferred configuration that the storage tank and the receiving tank each form a chamber of a combined double tank, the two chambers being separated by means of a variable intermediate wall. The latter may be formed for example as a flexible membrane.

A configuration of this type results in a significant reduction in the required tank volume, since the storage tank can be completely filled with decontamination liquid at the beginning of deployment and the volume for the receiving tank can be reduced to a minimum on account of the flexible intermediate wall that is used. During the decontamination, the decontamination liquid is applied to the surface to be decontaminated, for example of the interior of a vehicle, by means of the spray-extraction device. At the same time, the waste products from decontamination, that is to say the used decontamination liquid contaminated with contaminants and reaction products, are extracted again and transferred into the receiving tank of the combined double tank. While the proportion of ready-to-use decontamination liquid decreases continuously, the proportion of used decontamination liquid increases at the same time. Toward the end of the deployment, the receiving tank is then completely filled and the volume for the storage tank is reduced to a minimum.

It is preferably provided that the device has a filling-level indicator for the storage tank and/or the receiving tank.

It is favorable if the storage tank has a connection for external filling, so that it can be filled within a short time, for example via a hose line, by means of which the storage tank can be connected to a central supply tank atthe base station.

To prevent the liquids from freezing, the storage tank and the receiving tank are thermally insulated, in particular in the case of a configuration in the form of a combined double tank. In addition or alternatively, it may be provided that the storage tank and the receiving tank include a heating device, for example an electrical heating coil.

In the case of a particularly preferred embodiment, it is provided that the drive motor is configured as a fuel-operated engine. In this case, it is advantageous if the engine can be operated with either diesel fuel or with kerosene, as desired.

The decontamination of interior spaces is intended in particular for helicopters, transport aircraft and vehicles. To be able to reach these items, which may be located some distance away from one another, the device is provided with an automotive undercarriage. It is particularly advantageous for the automotive undercarriage to be configured as a crawler undercarriage and consequently to have particularly good off-road capabilities.

The undercarriage may include a hydraulic drive, the drive power of which is provided by the drive motor. In this case, the hydraulic drive may have a hydraulic pump, which drives a hydraulic motor for each chain of the crawler undercarriage. A configuration of this type ensures particularly good off-road capabilities, with forward and reverse travel being possible and climbing capabilities of up to approximately 50%, corresponding to an angle of 23°, being achievable.

The spray-extraction device preferably comprises a pump for delivering the decontamination liquid, a pressure line with an applicator disposed at its free end for transferring and applying the decontamination liquid delivered by the pump from the storage tank to the surface to be decontaminated and a suction line and a suction unit for taking up and returning the contaminated decontamination liquid from the surface into the receiving tank. It is advantageous here if the spray-extraction device can also be operated purely as a spray device for spraying a decontamination liquid or purely as an extraction device for taking up a used decontamination liquid. For this purpose, it may be provided for example that the spray-extraction device includes a switching device for the optional activation of just the pump or the suction unit or else for the simultaneous operation of both devices.

To facilitate handling, it is favorable if the pressure line and the suction line are integrated in a single application hose. For example, a double-walled hose with an outer wall and an inner wall disposed coaxially in relation to said outer wall may be provided, the inner wall defining a pressure line while the radially outer region between the inner wall and the outer wall accommodates the suction line. Such a type of configuration of the application hose has in particular the advantage that the used decontamination liquid, which has been heated on account of the thermal contact with the interior surface, which in many cases is at room temperature, is carried in the outer region of the application hose and consequently avoids cooling of the ready-to-use decontamination liquid in the pressure line, which is surrounded by the suction line.

To prevent the liquids from freezing, in a preferred embodiment it is provided that the application hose includes a heating element, for example the application hose may have an electrical heating band wrapped around it.

Alternatively or in addition, it may be provided that the application hose includes a thermal insulation.

The handling of the device according to the invention can be facilitated by the device having a hose drum for winding up the pressure line and the suction line. The hose drum may be operated for example by means of a hand crank, so that the pressure line and suction line, which are preferably configured in the form of the double-walled hose, can be unrolled in a simple way, in order to transfer the decontamination liquid into the interior space to be decontaminated, and the hose can be wound up again within a short time once decontamination has taken place. Particularly simple handling can be achieved here by the hose drum including rotary lead throughs for the pressure line and the suction line.

The pump and/or the suction unit are preferably disposed alongside the hose drum, so that the hose drum is heated by the waste heat of the pump or the suction unit and it is consequently possible to prevent decontamination liquid that remains in the wound-up hose from freezing within a short time.

In a particularly preferred embodiment it is provided that the pump, the suction unit and the hose drum are disposed in an accommodating space of the device that can be heated by the waste heat of the drive motor. For example, it may be provided that an exhaust line of the drive motor is led through the space accommodating the pump, the suction unit and the hose drum. This ensures that liquids remaining in the pump, the suction unit or the wound-up application hose also cannot freeze while the device is being transported, for example back to the base station after decontamination has taken place.

Alternatively or additionally, it may be provided that the device has a frost guard for covering the hose drum. The frost guard may be mounted on the storage tank or receiving tank in such a way that it can be removed or swiveled and enable the operator to gain access to the accommodating space in which the hose drum in particular is disposed.

BRIEF DESCRIPTION OF THE DRAWINGS

The following description of a preferred embodiment of the invention serves for further explanation in conjunction with the drawing, in which.

DETAILED DESCRIPTION OF THE INVENTION

Figure 1:
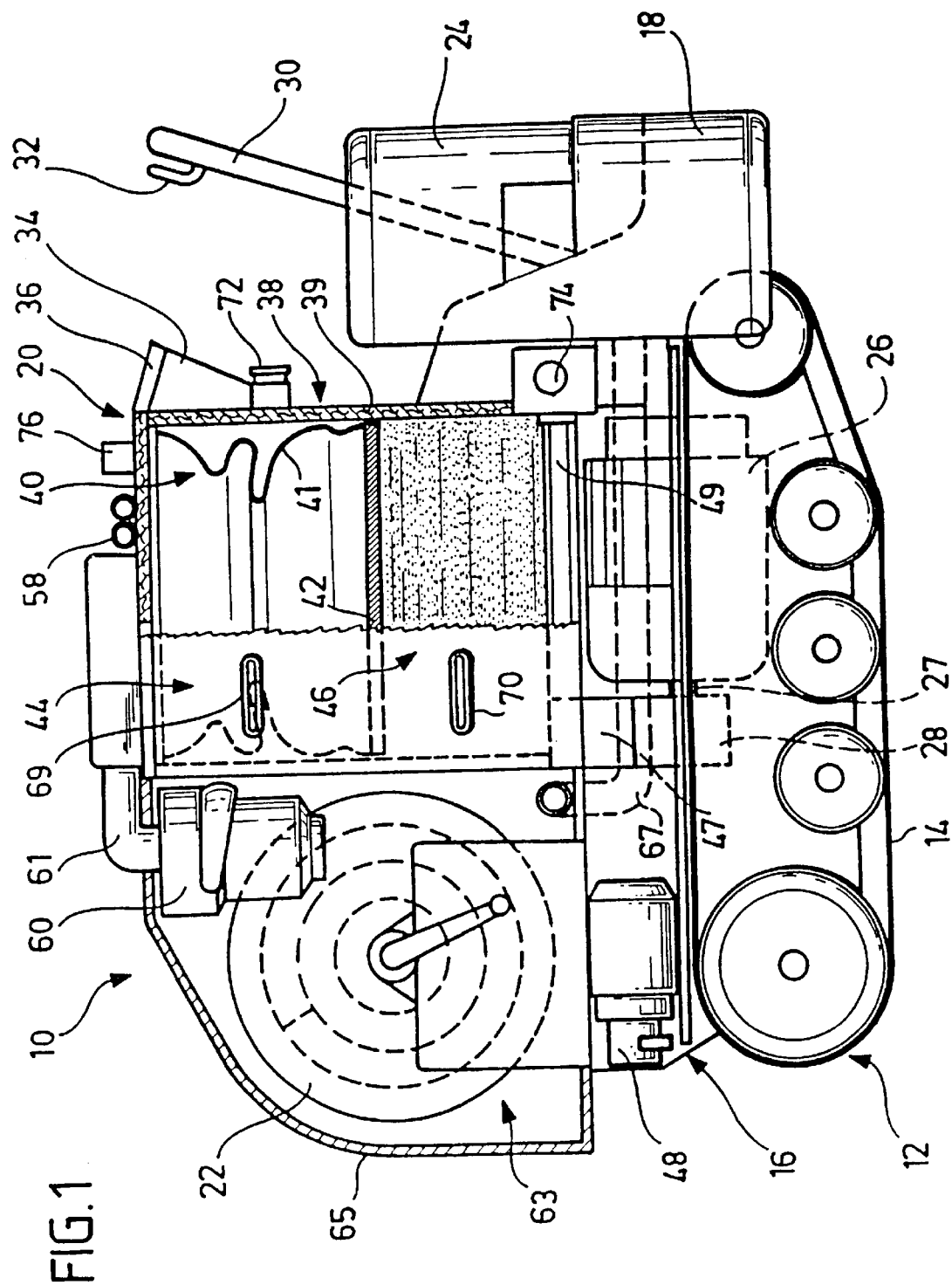
FIG. 1 shows a longitudinal section of a device for decontaminating interior spaces and FIG. 2 shows a front view of the device represented in FIG. 1 with the frost guard removed.
Figure 2:
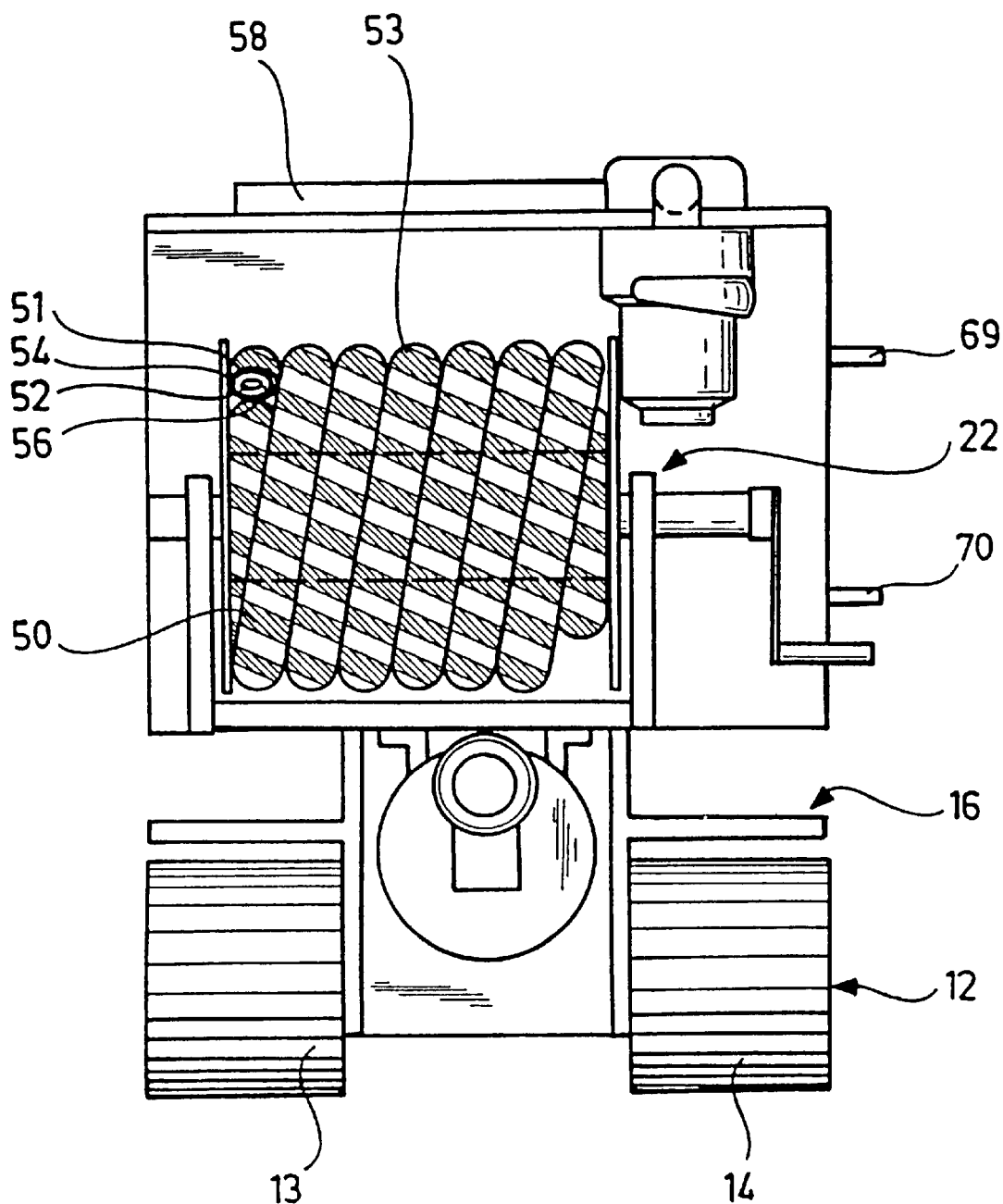

Represented in FIGS. 1 and 2 is a device for decontaminating interior spaces, which is denoted overall by the reference numeral 10. The device in question is an off-road, automotive vehicle with a crawler or chain undercarriage 12, which comprises two chains 13, 14 guided laterally along the device 10, and with a vehicle frame 16, which carries an engine mount 18, a liquid tank 20 and a hose drum 22.

The drive of the device 10 is provided by a diesel engine 24, which is mounted in the engine mount 18 and connected to a generator 26 by means of coupling elements which are known per se and are therefore not represented in the drawing. This generator has a continuous drive shaft 27, on the end of which that is remote from the diesel engine 24 a hydraulic pump 28 is flange-mounted and for its part drives hydraulic motors of the respective chain 13, 14 of the crawler undercarriage 12, said hydraulic motors being known per se and again not represented in the drawing. The hydraulic pump and the two hydraulic motors are activated by means of a hydraulic controller which is known per se and not represented.

Extending obliquely upward from the engine mount 18 is a steering handle 30, on which operating elements 32 for controlling the two hydraulic motors are mounted, only one of the operating elements being represented in the drawing.

Disposed on the liquid tank 20 approximately at the height of the free end of the steering handle 30 is an operating console 34, which accommodates control units 36 of the device 10.

The liquid tank 20 is of a double-walled form and comprises a heat-insulating outer wall 38 with an insulating material 39 and a variable intermediate wall 40 with a flexible membrane 41, which is aligned substantially vertically, and an approximately horizontally aligned separating wall 42. The flexible membrane 41 and the separating wall 42 are suspended in the liquid tank 20 in a bag-like manner and form a receiving tank 44, while the inner region of the liquid tank 20 beneath the separating wall 42 forms a storage tank 46.

For heating the liquid tank 20, an electrical heater 47 with a heating coil 49, which can be supplied with power by the generator 26, is disposed in its interior space.

The storage tank 46 receives a ready-to-use decontamination liquid and, by means of a storage line not represented in the drawing, is in flow connection with a pump 48 which is mounted on the vehicle frame 16 beneath the hose drum 22 and to which in turn a hose 50 wound up on the hose drum 22 is connected.

The hose 50 is of a double-walled form and has an outer wall 51 and an inner wall 52. The inner wall 52 delimits a pressure line 54 disposed centrally in the hose 50, while the radially outer region between the inner wall 52 and the outer wall 51 forms a suction line 56.

To prevent the decontamination liquid from freezing in the hose 50 during cold weather, the hose 50 is surrounded by a heating band 53. To supply power to the heating band 53, a plug-in contact (not represented), which is closed after the unrolling of the hose 50, is provided on the hose drum 22.

Alternatively, it may also be provided that the heating band 53 is integrated in the hose 50.

The pressure line 54 is in flow connection with the high-pressure connection of the pump 48, while the suction line 56 is connected by means of a connecting line (not represented in the drawing) to the receiving tank 44.

At the free end of the hose 50, an applicator 58, for example a spray nozzle with an integrated suction lip, can be connected by means of connecting elements which are known per se and have therefore been omitted from the drawing to achieve better overall clarity. As represented in the drawing, the applicator 58 can be releasably fastened above the liquid tank 20 while the device 10 is being transported.

Mounted alongside the hose drum 22 on the side of the liquid tank 20 facing away from the operating console 34 is a suction unit in the form of a suction turbine 60, which is in flow connection with the interior space of the receiving tank 44 by means of a suction-removal line 61. The suction turbine 60 allows a negative pressure to be created in the receiving tank 44.

The hose drum 22, the pump 48 and the suction turbine 60 are disposed alongside one another in the accommodating space 63 of the device 10 which is covered by a frost guard 65. The end region of an exhaust line 67 leaving the diesel engine 24 is led through the accommodating space 63. This has the consequence that the receiving space 63 can be heated by the hot exhaust gases of the diesel engine 24.

Disposed laterally on the outer wall 38 of the liquid tank 20 are mounting brackets 69, 70, which are only schematically represented in the drawing and on which additional equipment, for example an aerosol generator and/or a wet-dry suction device, can be releasably mounted.

Disposed beneath the control console on the outer wall 38 of the liquid tank 20 are a plurality of plug-in sockets 72. These are connected to the generator 26 by means of electrical lines not represented in the drawing and serve for supplying power to the additional equipment which can be fastened on the mounting brackets 69 and 70.

For decontaminating the interior space of a helicopter, for example, the storage tank 46 can be filled with an effective decontamination solution or emulsion, for example at a base station in the form of a central decontamination station. In addition, a fuel tank not represented in the drawing can be filled with diesel fuel for operating the diesel engine 24. The device 10 can then be transported by means of the off-road crawler undercarriage in a simple way, even over difficult terrain, to the helicopter requiring decontamination of its interior space. There, the hose 50 wound up on the hose drum 22 can be unrolled. Subsequently, decontamination liquid can be removed from the storage tank 46 by means of the pump 48 and sprayed via the pressure line 54 and the applicator 58 onto the surface to be decontaminated. The used decontamination liquid can then be sucked away via the applicator 58 and the suction line 56 and transferred into the receiving tank 44, which, for this purpose, has a negative pressure created in it by the suction turbine 60. To increase the decontaminating effect, the additional equipment mounted on the mounting brackets 69, 70 can then also be used, their power supply likewise being provided by the generator 26, like the power supply of the pump 48 and the suction turbine 60.

Once decontamination has taken place, the device 10 can be transported back to the base station. There, the receiving tank 44 can be pumped out by means of a suction-removal connection 74, and the storage tank 46 can then be re-filled with ready-to-use decontamination liquid by means of a filling connection 76. Consequently, the interior spaces of items which cannot be brought to a central decontamination station can be decontaminated in a simple way by means of the device 10 according to the invention.

What is claimed is:

1. A method of decontaminating interior spaces having irregular surfaces, comprising the steps of:
   providing a base station having a supply of decontamination agent and fuel;
   providing at least one independent self-propelled mobile subunit having decontamination equipment and a tank for ready-to-use decontamination agent;
   supplying the subunit with decontamination agent and fuel at the base station;
   transporting the subunit to an item with an interior space to be decontaminated;
   decontaminating the interior space using the decontamination equipment and decontamination agent of the subunit; and
   returning the subunit to the base station for re-supplying with decontamination agent and fuel;
   wherein said interior space to be decontaminated comprises one of a radioactively contaminated space, a biologically contaminated space, or a chemically contaminated space.

2. A system for decontaminating interior spaces having irregular surfaces, comprising:
   a base station having a supply of decontamination agent and fuel;
   a self-propelled mobile subunit, said subunit comprising:
      an off-road, automotive undercarriage;
      a drive motor for propelling said undercarriage;
      a storage tank mounted on said undercarriage for storing a decontamination liquid received from said base unit;
      a storage tank mounted on said undercarriage for storing fuel received from said base station;
      a receiving tank mounted on said undercarriage for storing used decontamination liquid; and
      a spray-extraction device mounted on said undercarriage for applying the decontamination liquid to an interior space to be decontaminated and for taking up the contaminated decontamination liquid from the space and transferring it into the receiving tank;
   wherein said interior space to be decontaminated comprises one of a radioactively contaminated space, a biologically contaminated space, or a chemically contaminated space.

3. The system in accordance with claim 2, wherein said subunit further comprises:
   at least one electrical connection element for the connection of electrically operated additional equipment;
   mounting elements for the mounting of said additional equipment;
   wherein said additional equipment comprises at least one of a wet-dry suction device, an aerosol generator, and a steam-extraction device.

4. The system in accordance with claim 2, wherein the receiving tank comprises a suction-removal connection for the extraction of the used decontamination liquid.

5. The system in accordance with claim 2, wherein the storage tank and the receiving tank each form a chamber of a combined double tank, the two chambers being separated from each other by means of a variable intermediate wall.

6. The system in accordance with claim 5, wherein the intermediate wall comprises a flexible membrane.

7. The system in accordance with claim 2, wherein the storage tank and the receiving tank are thermally insulated.

8. The system in accordance with claim 7, wherein the storage tank and the receiving tank include a heating device.

9. The system in accordance with claim 2, wherein the drive motor comprises a fuel-operated engine.

10. The system in accordance with claim 9, wherein the drive motor can be operated with one of diesel fuel or kerosene.

11. The system in accordance with claim 2, wherein the undercarriage comprises a crawler undercarriage.

12. The system in accordance with claim 2, wherein the undercarriage includes a hydraulic drive.

13. The system in accordance with claim 12, wherein the hydraulic drive has a hydraulic pump, which drives a hydraulic motor of the crawler undercarriage.

14. The system in accordance with claim 2, wherein the spray-extraction device comprises:
   a pump for delivering the decontamination liquid;
   a pressure line with an applicator disposed at its free end for transferring and applying the decontamination liquid delivered by the pump from the storage tank to the surface to be decontaminated; and
   a suction line and a suction unit for taking up and returning used decontamination liquid into the receiving tank.

15. The system in accordance with claim 14, wherein the pressure line and the suction line are integrated in a single application hose.

16. The system in accordance with claim 15, wherein the application hose has a thermal insulation.

17. The system in accordance with claim 15, wherein the application hose includes a heating element.

18. The system in accordance with claim 15, wherein said subunit further comprises a hose drum for winding up the pressure line and the suction line.

19. The system in accordance with claim 18, wherein at least one of the pump and the suction unit are disposed alongside the hose drum.

20. The system in accordance with claim 18, wherein the pump, the suction unit and the hose drum are disposed in an enclosed space of the subunit that can be heated by waste heat of the drive motor.

21. The system in accordance with claim 18, wherein said subunit further comprises a frost guard for covering the hose drum.

22. The system in accordance with claim 2, wherein said subunit further comprises a generator associated with said drive motor.

* * * * *